Figure 6:
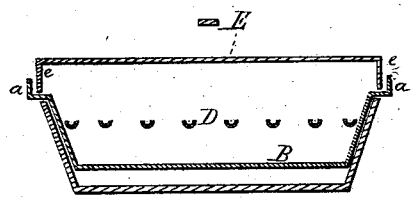

(No Model.)　　　　　　R. E. DIETZ.　　　　2 Sheets—Sheet 1.
BROILER FOR OIL OR GAS STOVES.
No. 258,999.　　　　　　　　　Patented June 6, 1882.
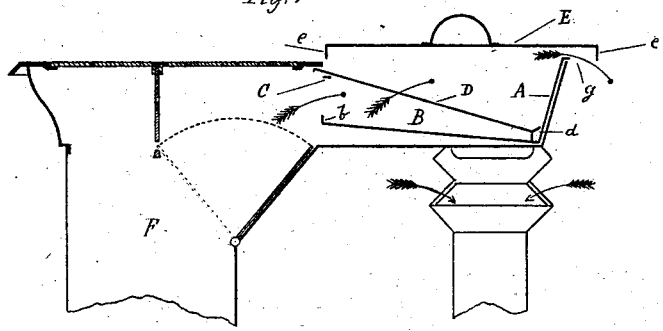
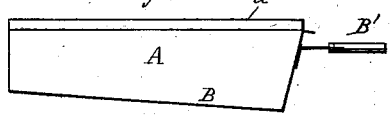 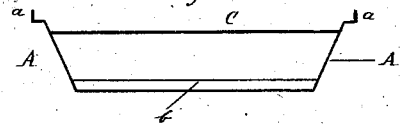
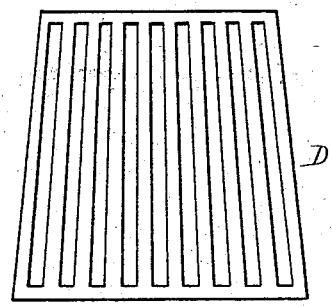
Witness=
Wm. A. Lane
F. W. Hanaford
Inventor=
Robert E. Dietz
By A. M. Pierce,
Atty.

(No Model.) 2 Sheets—Sheet 2.
R. E. DIETZ.
BROILER FOR OIL OR GAS STOVES.

No. 258,999. Patented June 6, 1882.

Witnesses=
Wm A. Lowe
John Buckler

Inventor=
Robert E. Dietz
By A. M. Pierce.
Atty

UNITED STATES PATENT OFFICE.

ROBERT E. DIETZ, OF NEW YORK, N. Y.

BROILER FOR OIL OR GAS STOVES.

SPECIFICATION forming part of Letters Patent No. 258,999, dated June 6, 1882.

Application filed March 20, 1882. (No model.)

*To all whom it may concern:*

Be it known that I, ROBERT E. DIETZ, of New York city, county of New York, and State of New York, have invented certain new and useful Improvements in Broilers for Oil or Gas Stoves, of which the following is a full, clear, and exact description, reference being had to the accompanying drawings, and to the letters of reference marked thereon.

My invention relates especially to cooking utensils employed upon oil or gas stoves, and has for its object the production of a device for broiling, toasting, &c., by the direct action of the heat; and it consists essentially in constructing a gridiron and inclosing-pan for catching the juices of the meat which fall therefrom in cooking; and my invention involves certain novel and useful combinations or arrangements of parts and peculiarities of construction and operation, all of which will be hereinafter first fully described, and then pointed out in the claims.

Heretofore all utensils employed for cooking meat upon oil or gas stoves have been adapted only for frying, as in oil or gas stoves of ordinary construction the utensil is placed directly above the flame. If meat were placed upon an ordinary gridiron over such a flame, the juices and fat would fall upon the burners and wicks, causing a smoke, which would render the meat unfit for consumption and clog the burners in such a manner as to interfere with combustion. By my construction and arrangement these difficulties are overcome.

In the drawings, Figure 1 is a vertical sectional view of my improved broiler placed in position upon a stove. Fig. 2 is a side elevation, and Fig. 3 an end elevation, of the pan. Fig. 4 is an enlarged plan view of the gridiron. Fig. 5 is a sectional view of one of the gridiron-bars; and Fig. 6 is a vertical sectional view of my device at right angles to Fig. 1.

Like letters of reference, wherever they occur, indicate corresponding parts in all the figures.

A is a pan, constructed of sheet or cast metal, and adapted and arranged to fit into an oil or gas stove, as shown in Fig. 1. The bottom B of pan A slopes gradually from front to back, in order to throw all liquid substances from the front to the coolest part of the device.

$b$ is a strip of metal extending across the pan from side to side, giving additional strength thereto, and serving to prevent an overflow of the juices of the meat.

C is a rod or bar extending across the top of the pan from side to side, holding the parts in place, and serving as a support for the sloping gridiron or grate D. Said grate may be constructed of cast or sheet metal or wire, and provided at its lower extremity with legs $d$, which elevate it slightly above the bottom of the pan.

If desired, instead of being supported by legs $d$, the grate may be hinged to the sides or back of pan A in such a manner as to be easily raised up for reaching the bottom of the pan.

When constructed of sheet or cast metal the bars of the grate may be made concave, as shown at $d'$, Fig. 5, whereby the juices of the meat will be carried to the lower extremity of the pan.

Pan A is provided with a handle, B', for convenience in removing from the stove, and has a raised bent edge, $a$, therearound, which fits over the sides of the hot-air conduit of the stove and serves as a support for the cover E, having a bent edge, $e$, fitting over the top of the device.

When articles to be cooked are placed upon grate D and the device is put within the stove the products of combustion will pass directly from the combustion-chamber F through the opening in the end of the pan, between bars $b$ and C, and under and through grate D, escaping over the top of the pan at $g$, cover E extending sufficiently beyond the top of the pan and stove in such a manner as to leave the requisite exit for the products of combustion after being utilized.

By such a construction and arrangement the article to be cooked is subjected to the direct action of the heat, and being in the path of the escaping products of combustion is thoroughly and properly cooked; while by placing the grate at an angle and by the slope given to the bottom of the pan the juices of the meat may be saved. When not desired for use the device may be removed from the stove, and the ordinary top be placed thereon.

Having now fully described my invention, what I claim as new therein, and desire to secure by Letters Patent, is—

1. A broiler for use upon oil or gas stoves adapted and arranged to fit within the conduit for products of combustion, the walls of said broiler resting against the walls of said conduit, substantially as shown and described.

2. A broiling device for use upon oil or gas stoves, consisting of a pan adapted and arranged to fit within the conduit for the products of combustion, said pan being provided with sides and an end wall which rest against the walls of the conduit, as set forth, and a gridiron or grate located below the level of the top of the stove and supported within the pan, substantially as shown and described.

3. In a broiler for use upon oil or gas stoves, a pan, A, open at one end for the admission of heated products of combustion, in combination with a cover, E, adapted and arranged to fit over the pan, leaving an outlet for the exhausted products of combustion at the extremity of the pan most remote from the source of heat, substantially as shown and described.

4. In a broiler for use upon oil or gas stoves, the pan A, having sloping bottom B, cross-bar C, and turned edge a, said pan being adapted and arranged to fit within the conduit for the products of combustion from the flame-space, the back and side walls of the pan resting against the walls of said conduit, as specified, in combination with a sloping gridiron or grate, D, inclosed in said pan, and a cover, E, fitting over the whole, substantially as shown and described.

In testimony that I claim the foregoing I have hereunto set my hand in the presence of two witnesses.

ROBERT E. DIETZ.

Witnesses:
F. W. HANAFORD,
A. M. PIERCE.